United States Patent
Fischer

[11] Patent Number: 6,158,725
[45] Date of Patent: *Dec. 12, 2000

[54] DEVICE FOR STORING ENERGY IN SPRING STORAGES

[76] Inventor: Friedrich Fischer, Allermoeher Deich 35, 21037 Hamburg, Germany

[*] Notice: This patent is subject to a terminal disclaimer.

[21] Appl. No.: 09/414,856

[22] Filed: Oct. 12, 1999

Related U.S. Application Data

[62] Division of application No. 08/952,212, Nov. 19, 1997.

[30] Foreign Application Priority Data

May 19, 1995 [DE] Germany .................. 195 18 400

[51] Int. Cl.[7] .................................................. F16F 1/06
[52] U.S. Cl. .......................... 267/168; 267/285; 16/308
[58] Field of Search ......................... 267/166, 168, 267/169, 170, 174, 175, 179, 285, 273, 284; 16/281, 284, 285, 296, 305, 307, 308, 324, 325, 328, 329; 185/38, 45

[56] References Cited

U.S. PATENT DOCUMENTS

| | | |
|---|---|---|
| 3,335,454 | 8/1967 | Dunster, Jr. ................. 16/278 |
| 3,759,503 | 9/1973 | Moore ....................... 267/275 |
| 3,898,708 | 8/1975 | Gwozdz ....................... 16/72 |
| 4,408,799 | 10/1983 | Bowman ..................... 16/242 |
| 4,485,522 | 12/1984 | Chen ......................... 16/54 |
| 4,783,882 | 11/1988 | Frolov ....................... 16/72 |
| 4,951,351 | 8/1990 | Eckel ........................ 16/285 |
| 5,109,571 | 5/1992 | Ohshima et al. .............. 16/307 |
| 5,390,904 | 2/1995 | Rivard et al. ............... 267/275 |
| 5,590,440 | 1/1997 | Pelt et al. .................. 16/111 |
| 5,634,241 | 6/1997 | Fischer ...................... 16/285 |
| 5,673,459 | 10/1997 | Baghdasarian ............... 16/308 |
| 5,682,644 | 11/1997 | Bohacik et al. .............. 16/284 |
| 5,894,632 | 4/1999 | Fischer ...................... 16/285 |

*Primary Examiner*—Matthew C. Graham
*Assistant Examiner*—Thomas J. Williams
*Attorney, Agent, or Firm*—Oblon, Spivak, McClelland, Maier & Neustadt,

[57] ABSTRACT

The device serves for storing energy. A spatial work range is defined by a displacement path upon compression of at least one spring of the spring storage. Along the work range in the working direction, at least two springs are arranged which are impinged in temporal succession upon compression and relaxation, respectively. For impinging the springs, at least one stationary retaining element and a mobile runner are provided. A spring loaded at a first point of time is immobilized in such a way that during a further displacement of the runner no further force is exerted by this spring between runner and retaining element. Reactivation of the immobilized springs is provided in temporal succession upon a reverse movement of the runner.

10 Claims, 16 Drawing Sheets

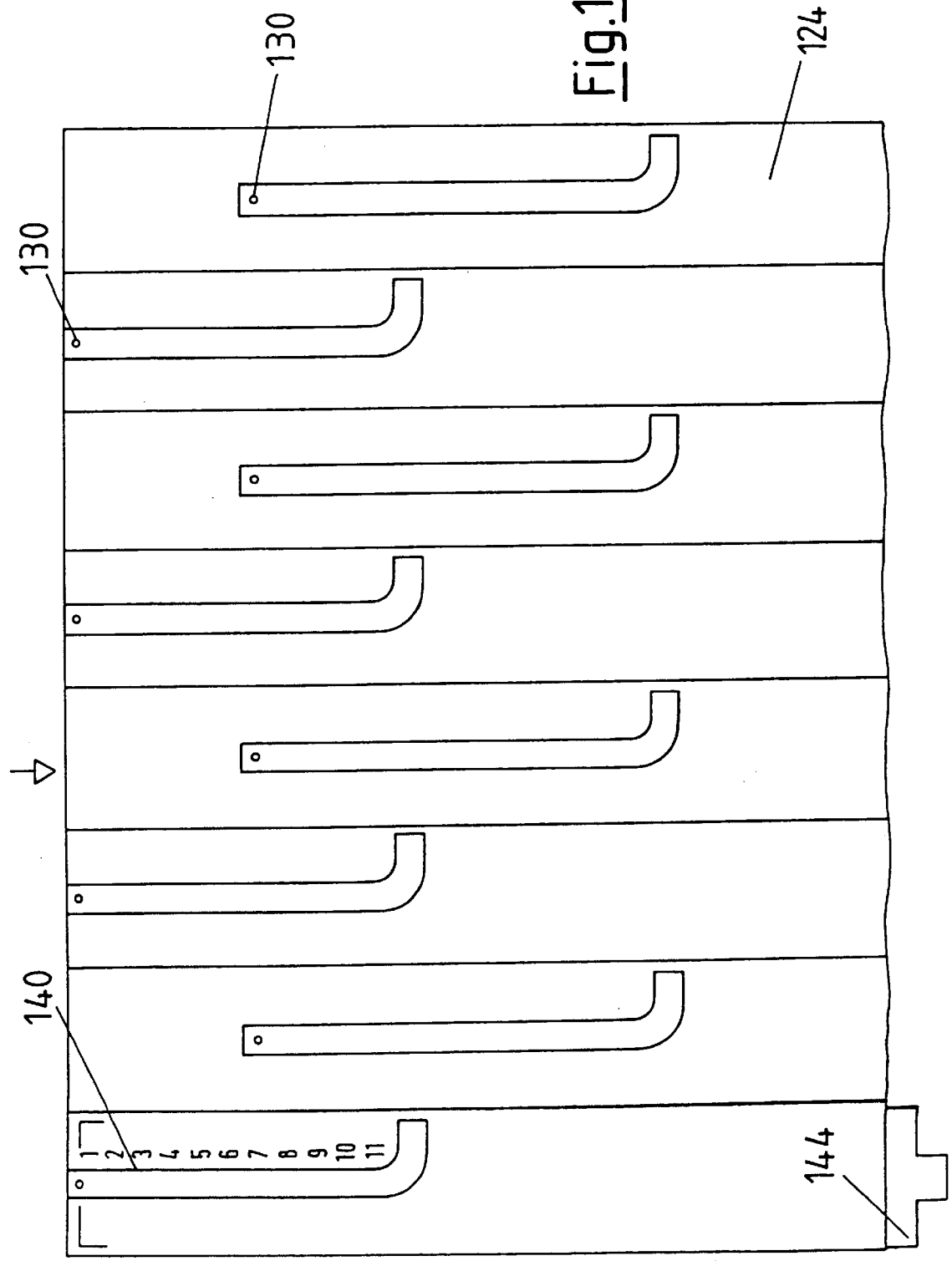

DEVICE FOR STORING ENERGY IN SPRING STORAGES

This application is a divisional of application Ser. No. 08/952212, filed Nov. 19, 1997

TECHNICAL FIELD

The invention concerns a rotary joint for at least two parts which are movable relative to each other, e.g. for end gates of vehicles.

The invention moreover concerns a device for storing energy in spring storages wherein a spatial work range is defined by a displacement path described upon compression of at least one spring of the spring storage.

BACKGROUND ART

Devices for storing energy in spring storages, wherein energy release and energy absorption of the spring storages are programmable in accordance with the displacement paths, are described for example in German Utility Model G 93 00 903.8 and in International Patent Application WO 94/17 271. Concurrently with a progressively developing technology it is been found that technical supplementations may by carried out to the devices described in these documents to make them available for further possible applications. A simple energy storage device making use of springs, wherein the spring can be immobilized in a loaded condition, is also described e.g. in U.S. Pat. No. 3,335,454.

The known energy storing spring joints of the prior art in particular present the drawback that freedom in predetermining the release of energy is still subject to restrictions. In particular it is not sufficiently made possible by the energy storage spring joints of the prior art to predetermine developments of forces along a displacement path virtually at will.

DISCLOSURE OF INVENTION

It is therefore the object of the present invention to furnish a rotary joint e.g. for end gates of vehicles, whereby predeterminable spring forces are developed.

This object is attained in accordance with the invention in that at each of the parts, at least one mounting member for mounting a stop range of a spring is arranged, with the spring biasing the parts relative to each other at least during part of the displacement.

It is another object of the present invention to avoid the use of larger-dimensioned springs where greater distances are to be covered.

This object is attained in accordance with the invention in that along the work range in the working direction at least two springs are arranged which, upon compression or relaxation, respectively, are impinged in temporal succession; that at least one stationary retaining element and one mobile runner are provided for impinging the spring; that a spring loaded at a first point of time is immobilized in such a way that during a further displacement of the runner no further force is exerted by this spring between runner and retaining element; and that reactivation of the immobilized springs is provided in temporal succession upon a reverse movement of the runner.

Finally it is also an object of the present invention to enable loading of the spring storage with a low expenditure of force.

This object is attained in accordance with the invention in that the springs arranged in the area of the spring storage may be arranged such as to act in parallel in the working direction at least upon release of the spring energy.

As a result of the variations in accordance with the invention, devices are furnished which are applicable for an expanded range of use. The rotary joint for the parts having relative mobility with respect to each other enables virtually any mechanical programming of acting forces which act either contrary to the displacement direction or in the direction of displacement. The activation points of the respective forces may be predetermined at will along the displacement path. When used in the field of end gates for vehicles, a multiplicity of hazards are precluded which presently occur when the hatches are opened manually. The invention is thus suited to considerably improve working safety.

The option of immobilized loaded springs along a displacement path moreover makes it possible to have a runner move along a long path relative to a stator without having to use springs of correspondingly large dimensions. It is, for example, possible to construct devices for transporting loads in such a way that energies are stored in the springs upon lowering the loads, and that the stored energies support the lifting motion upon renewed lifting. The energy released upon lowering the loads accordingly need not be braked and converted into thermal energy, but the energy is stored mechanically and can again be made available for other uses. It is therefore only necessary for a like lifting device to provide the amount of energy which exceeds the stored energies. Compensating changes in the potential energy by means of changes in elevation has hitherto be obtained only in the field of elevators through employing counterweights which are, via deflection sheaves, coupled to the elevator per se. Such counterweights do, however, result in increased inertia and moreover strain the deflection sheaves.

Finally it is possible by subdividing a spring into single springs in accordance with the invention to reduce spring dimensions, as in the case of longer distances to be covered, not all the required forces need to be received by a single spring. The forces are rather distributed to a plurality of springs, such that considerably lower forces will attack at each single spring. (e.g. by subdividing a large spring to ten small-size springs, the total weight of these ten small springs may be reduced in comparison with the structural weight of one large-sized spring). This results in reduced dimensions of the components and saves energy when used in the field of vehicles inasmuch as the eliminated structural weight does not have to be accelerated and decelerated.

In order to predetermine defined pressing forces in a starting condition it is proposed that at least one of the springs may be subjectable to a biasing force.

Furnishing displacement ranges without the application of spring force is realized by providing an open path for at least one of the springs.

A space-saving assembly is provided if at least one of the springs has the form of a torsion spring.

Simple mechanical guidance may be obtained if the spring is provided with a drive pin guided in a guide groove.

In order to realize mechanical storage of the spring forces, it is possible to provide a receiving recess for the drive pin in a loaded condition of the spring.

In accordance with another embodiment it is provided that the spring has the form of a linear spring.

In order to predetermine complex force/path-diagrams, it is possible to provide at least two springs.

Increased freedom in predetermining a release of energy is realized in that different activation points are provided for the springs.

It is furthermore possible to provide different deactivation points for the springs.

Upon application in the field of hinges or turning joints, it is in particular suitable if the retaining element is in the form of a sleeve.

A mechanically simple embodiment which is encapsulated for protection against dirt is provided through the fact that the runner is guided inside the sleeve-shaped retaining element.

For particular applications it is, however, also possible for the runner to be guided externally of the retaining element.

In order to provide lifting systems, it is suitable if at least one of the springs has the form of a spiral spring.

Storing energy may be realized in a simple manner due to the fact that the spring may in a loaded condition be immobilized in a reception of the retaining element through a pressure member.

In order to provide approximately continuous energy release patterns, it is provided that at least two springs have work ranges overlapping in the direction of displacement.

In order to enable different energy release patterns at predeterminable work locations it is proposed to provide programmable release for the springs.

Freedom in predetermining displacement paths is further increased by providing predeterminable intermediate immobilization positions for the springs.

Suitable implementation of mechanical programming is attained through the fact that a guide groove for guiding a drive pin of the spring is subdivided into transversal and longitudinal segments.

In order to reduce production costs, it is proposed to allocate several springs to respective separate work modules, with at least two work modules being arranged sequentially in the working direction.

A further variation consists in at least one of the springs having the form of a gas pressure spring.

In accordance with another embodiment it is provided that at least one of the springs has the form of a spiral spring which, in the range of one end thereof, is secured to a rotation shaft.

A mechanically simpler and more robust construction is provided in that a permanent parallel arrangement is provided for the springs.

For application in the field of hinges or rotational joints, particularly in the field of hinges for agricultural tools, trailers or trucks, it is proposed for the springs to be secured to a sleeve in the range of one end thereof and to a shaft in the range of another end thereof.

BRIEF DESCRIPTION OF THE DRAWINGS

The drawing schematically represents embodiments of the invention, wherein:

FIG. 18 shows the developed surface of the main pressure tube according to FIG. 17.

BEST MODE FOR CARRYING OUT THE INVENTION

Figure 1:
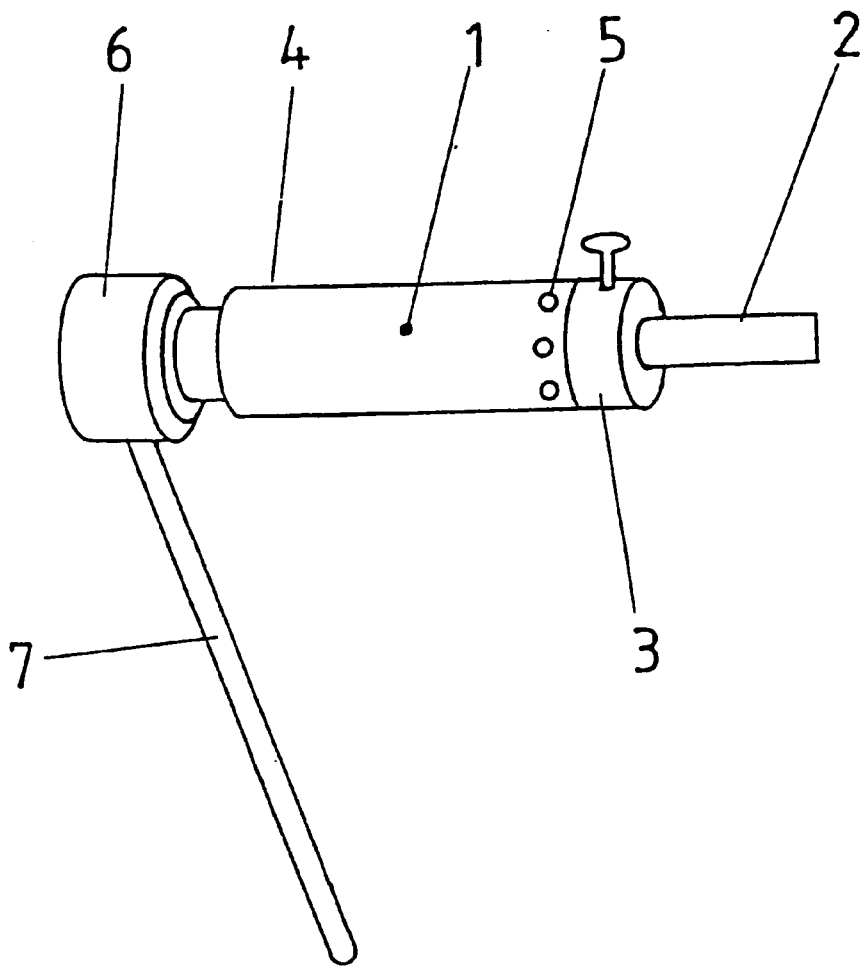
FIG. 1 is a perspective representation of a device having the form of a rotary joint and provided with torsion springs.

FIG. 1 shows in a perspective representation a rotary joint 1 which comprises a spindle 2, a spring receiving sleeve 3 and a biasing sleeve 4. Owing to rotation of the biasing sleeve 4 relative to the spring receiving sleeve 3, a biasing force may be applied to springs arranged inside the spring receiving sleeve 3. It is e.g. possible to provide the biasing sleeve 4 with latch recesses 5 and thus enable stepped bias.

To an end of the spindle 2 projecting from the spring receiving sleeve 3 a drive member 6 carrying a coupling rod 7 is fastened. The coupling rod 7 is capable of transferring torque to a part to be positioned, or introducing torque generated by that part into the rotary joint 1.

Figure 2:
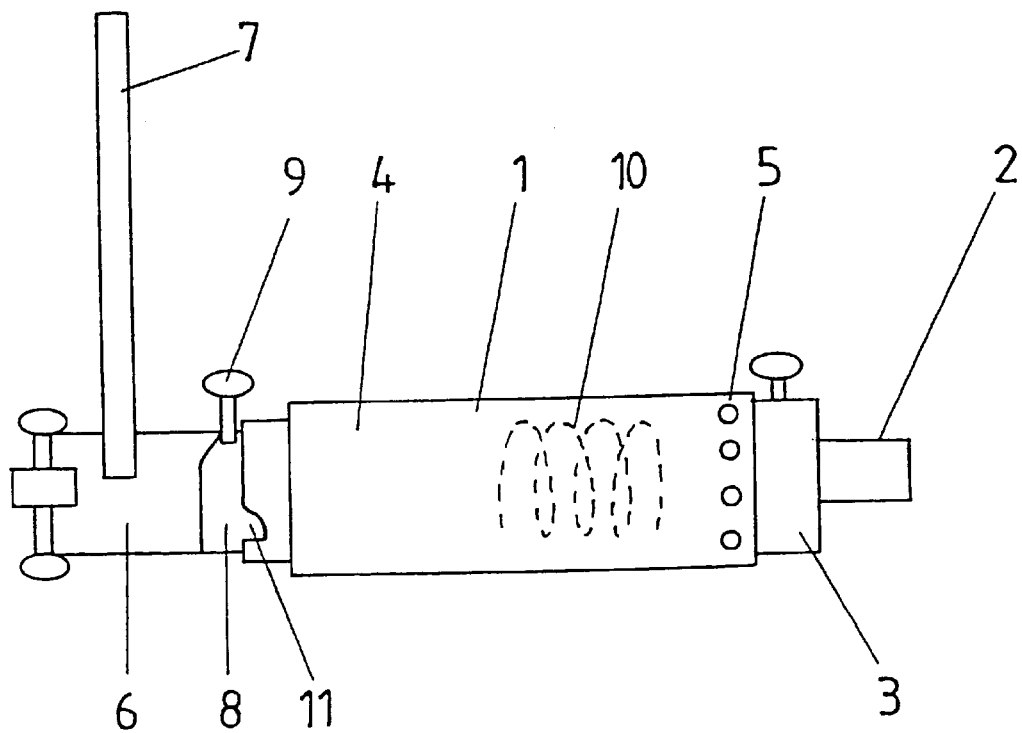
FIG. 2 is another representation of the device according to FIG. 1.

FIG. 2 illustrates in another representation the functions of the rotary joint 1 in accordance with FIG. 1. In particular it can be seen that the drive member 6 comprises a guide groove 8 for a drive pin 9 which transmits forces generated by springs 10 arranged inside the spring receiving sleeve 3 to the drive member 6. In particular it was conceived to design the guide groove 8 in such a way that at least one open path can be realized. The open path can, for instance, be provided at the beginning of the movement. It is, however, also possible to realize a bias as early as at the beginning of the displacement.

Following a predeterminable rotation of the drive member 6 relative to the spring receiving sleeve 3, the drive pin 9 is transferred into a receiving recess 11 and immobilized there. The drive member 6 therefore is not subjected to any further application of force and may continue to move freely. Upon a movement of the drive member 6 in the opposite direction, the drive pin 9 is, upon juxtaposition of receiving recess 11 and guide groove 8, returned into the range of the drive member 6 and applies stored spring energy to the drive member 6. In order to facilitate the transition of the drive pin 9 between the guide groove 8 and the receiving recess 11, it is possible to guide a roller on the drive pin 9 which rolls on respective provided flanks.

Figure 3:
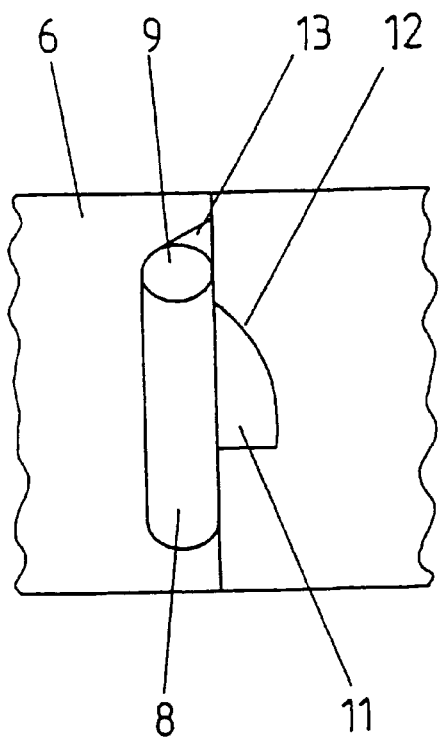
FIG. 3 is an enlarged representation of a range provided for guiding and immobilizing a spring drive pin.

FIG. 3 again shows, in an enlarged representation, the arrangement of the drive pin 9 in the range of guide groove 8 and receiving recess 11. In particular it can be seen that in the area of the guide groove 8 and of the receiving recess 11 inclined ramps 12, 13 are arranged. The ramps 12, 13 facilitate the transition of the drive pin 9 as, owing to the acting spring forces, force components directed transversally with respect to the direction of displacement and supporting the transition of the drive pin 9 are generated by the ramps 12, 13.

Figure 4:
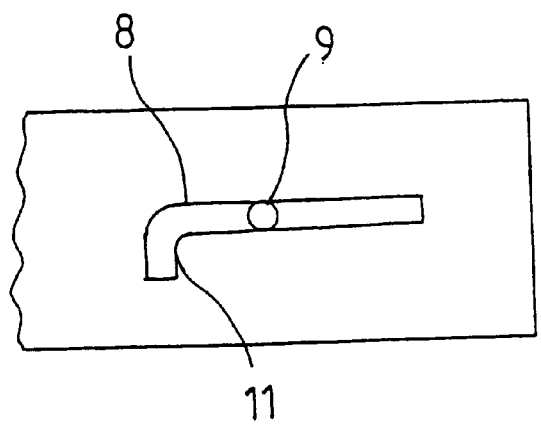
FIG. 4 is a representation of a guide for the spring drive pin with use of linear tension springs or pressure springs.

FIG. 4 shows another embodiment wherein linear springs, e.g. tension springs or pressure springs, are employed instead of torsion springs. The drive pin 9 there is displaced in a linear guide groove 8 and immobilized in a receiving recess 11 which has an orientation essentially transversal with respect to the guide groove 8.

Figure 5:
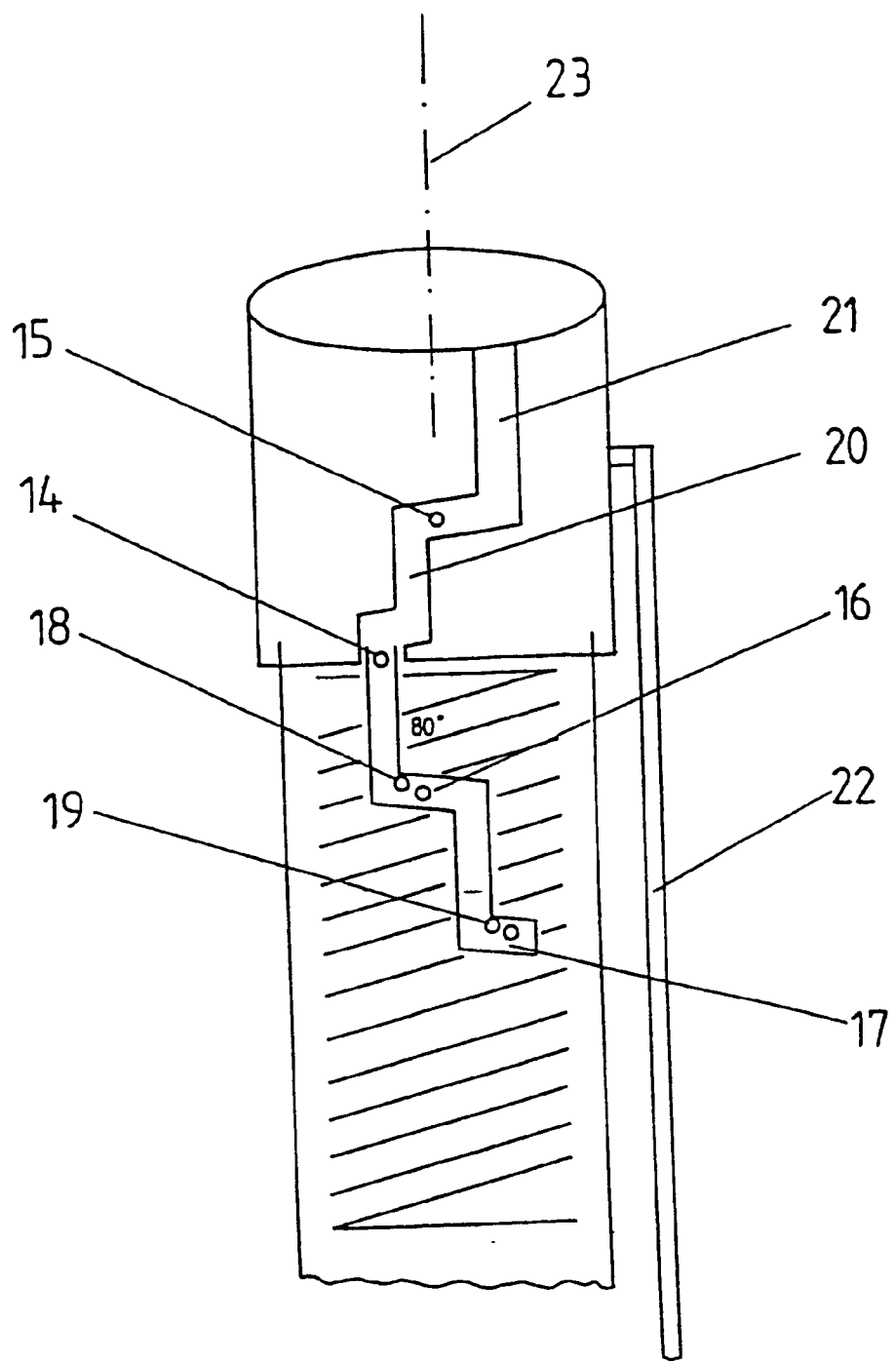
FIG. 5 is a partly cut-open representation of a device having a programming path with multiple subdivisions.

FIG. 5 illustrates another embodiment. The guide groove is in this case arranged along a guide sleeve. A first drive member 14 and a second drive member 15 are provided. Release of energy may occur e.g. such that a first stage 16 is activated at a rotation angle of 80 degrees and a second stage 17 is activated at a rotation angle of 50 degrees. Retaining projections 18, 19 are provided for positioning the drive pin 9. For an angular range starting from 40 degrees a first open path 20 may be provided, and for an angular range starting from 10 degrees a second open path 21 may be provided. The spring 10 is arranged inside the spring receiving sleeve 3. An output of force is effected via an energy transmission rod 22. The open path ranges 20, 21 essentially have the form of slots extending in the direction of a longitudinal axis 23.

Figure 6:
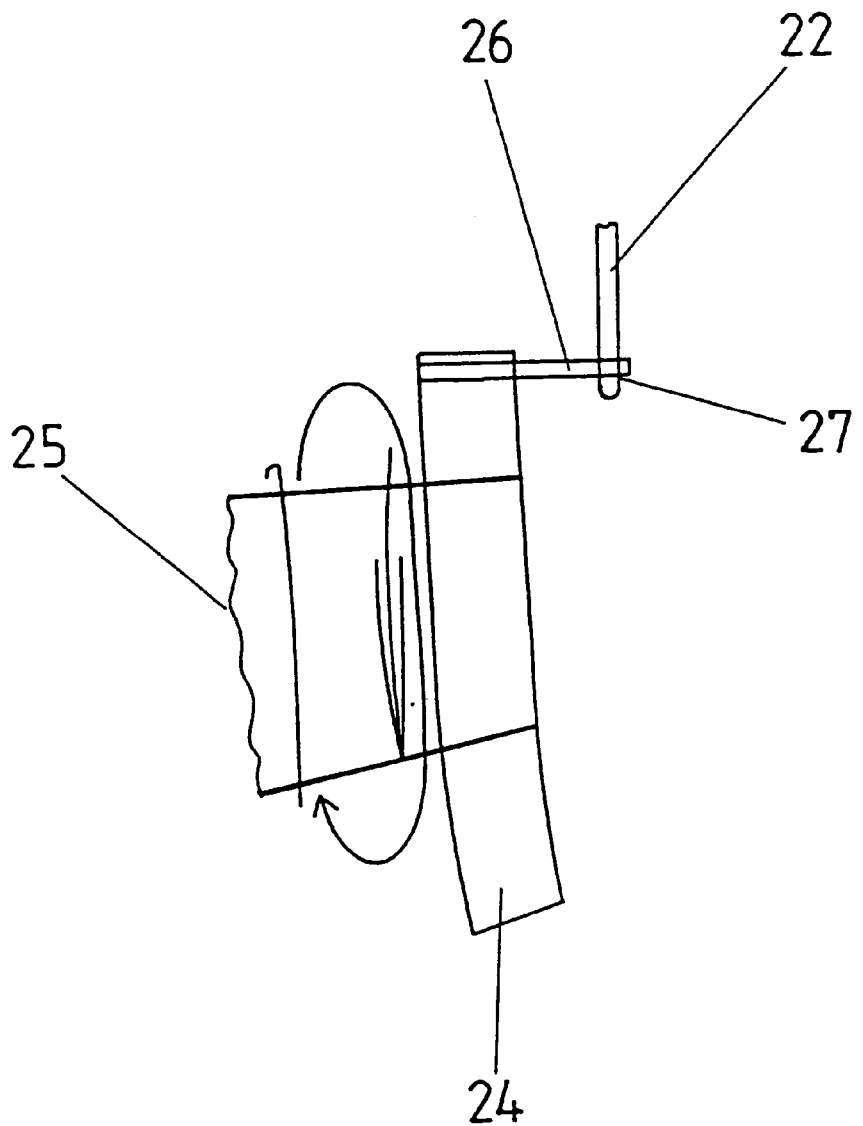
FIG. 6 is a representation of coupling of the push rod of the device according to FIG. 5 to a rotary joint.

FIG. 6 illustrates coupling of the energy transmission rod 22 to a wheel 24 seated on a shaft 25. In the range of the wheel 24 a transverse rod 26 is fastened which is coupled to the energy transmission rod 22 via a bush 27. Hereby it is possible to convert the longitudinal movement of the energy transmission rod 22 into a rotary movement of the wheel 24. With reference to the description of FIG. 5, a tensioning force is applied to the wheel 24 starting from a rotation angle of 80 degrees, changing into an open path at 40 degrees. At 50 degrees, tensioning of the second member occurs, which is provided with an open path at 10 degrees.

Figure 7:
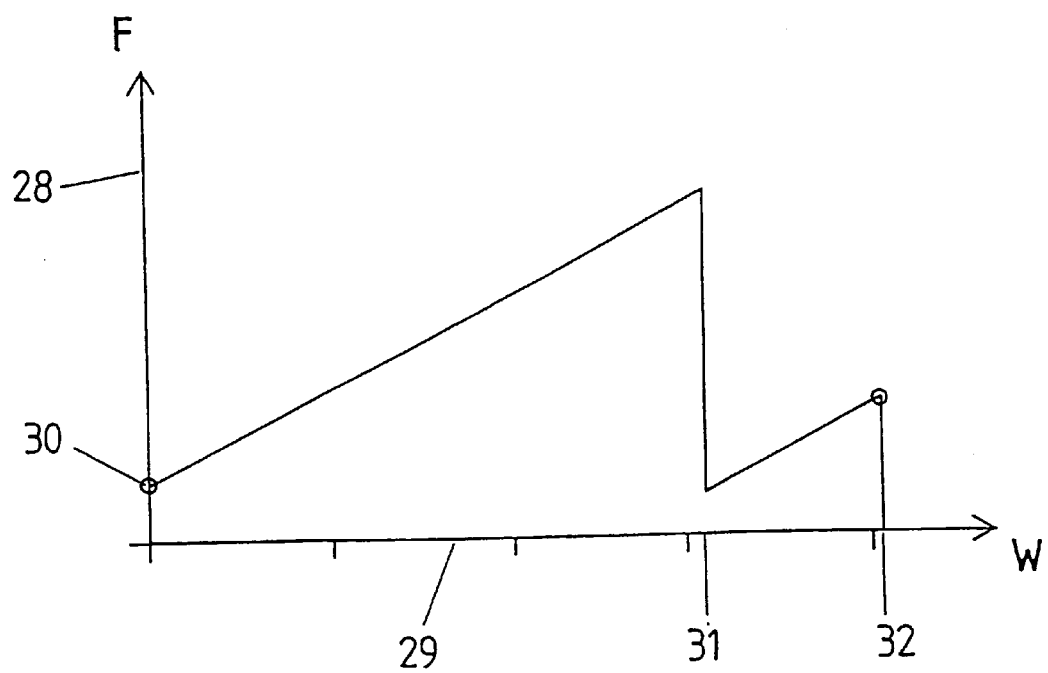
FIG. 7 shows an example for the development of programmed release of energy along a displacement path.

FIG. 7 shows an example for a development of forces which may be generated in a diagram comprising a force axis 28 and a path axis 29. A bias point 30 is provided which initially is increased linearly along the displacement path. At a changeover point 31 an open path takes effect which is furthermore overlapped by a second spring already provided with a bias at the changeover point 31. Behind the changeover point 31, linear increase of force again occurs as far as a terminal point 32. From the terminal point 32 in turn an open path takes effect which causes the application of force to be returned to Zero.

Figure 8:
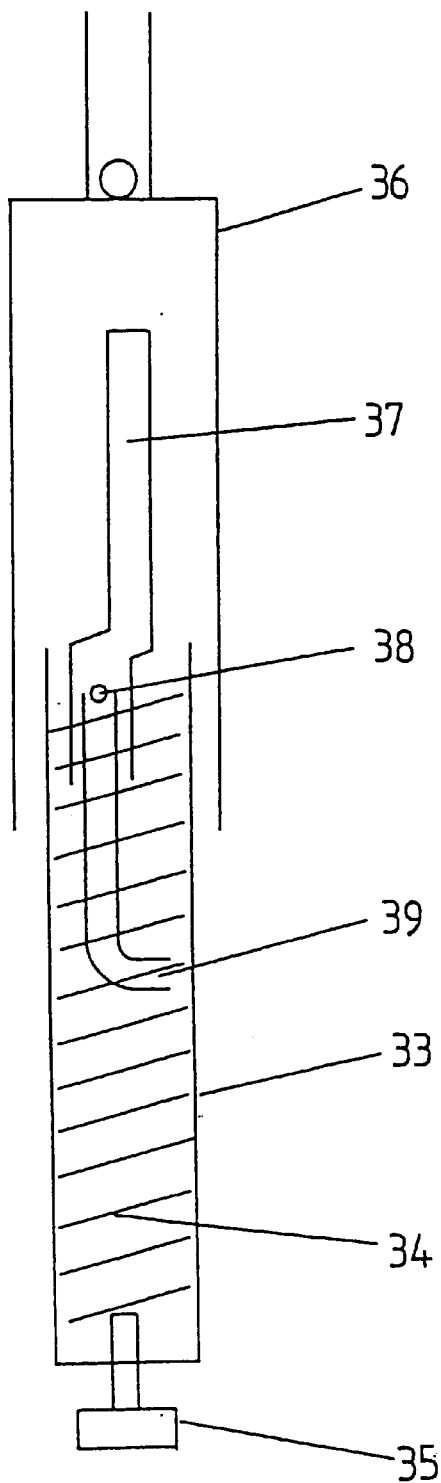
FIG. 8 is a schematic representation of a predetermined programming path including an open path.

FIG. 8 shows another embodiment of the invention. A sleeve-shaped standing body 33 is provided in a cavity thereof with a spring 34. Via an adjustment member 35 a spring pressure can be predetermined. An energy-receiving sleeve 36 is guided on the standing body 33. An output of force is performed in a lateral position from the energy-receiving sleeve 36. A programmable switching path 37 may have the form of a slot in the area of the standing body 33 as well as of the energy-receiving sleeve 36. The spring engages the switching path 37 via a drive member 38. In the range of a latch 39, the drive member 38 can be immobilized following loading of the spring 34. Basically several such standing bodies 33 having an energy-receiving sleeve 36 can be arranged sequentially. It is basically also possible to arrange additional external springs surrounding the standing body 33.

As an alternative for the use of springs 34 having the form of tension springs or pressure springs, use of further energy storage elements is also possible. It is, for example, possible to use gas pressure springs. It is equally possible to provide predetermined latch positions.

Spring-loaded rollers or wheels rolling inside a support member may moreover be used as guide members.

Figure 9:
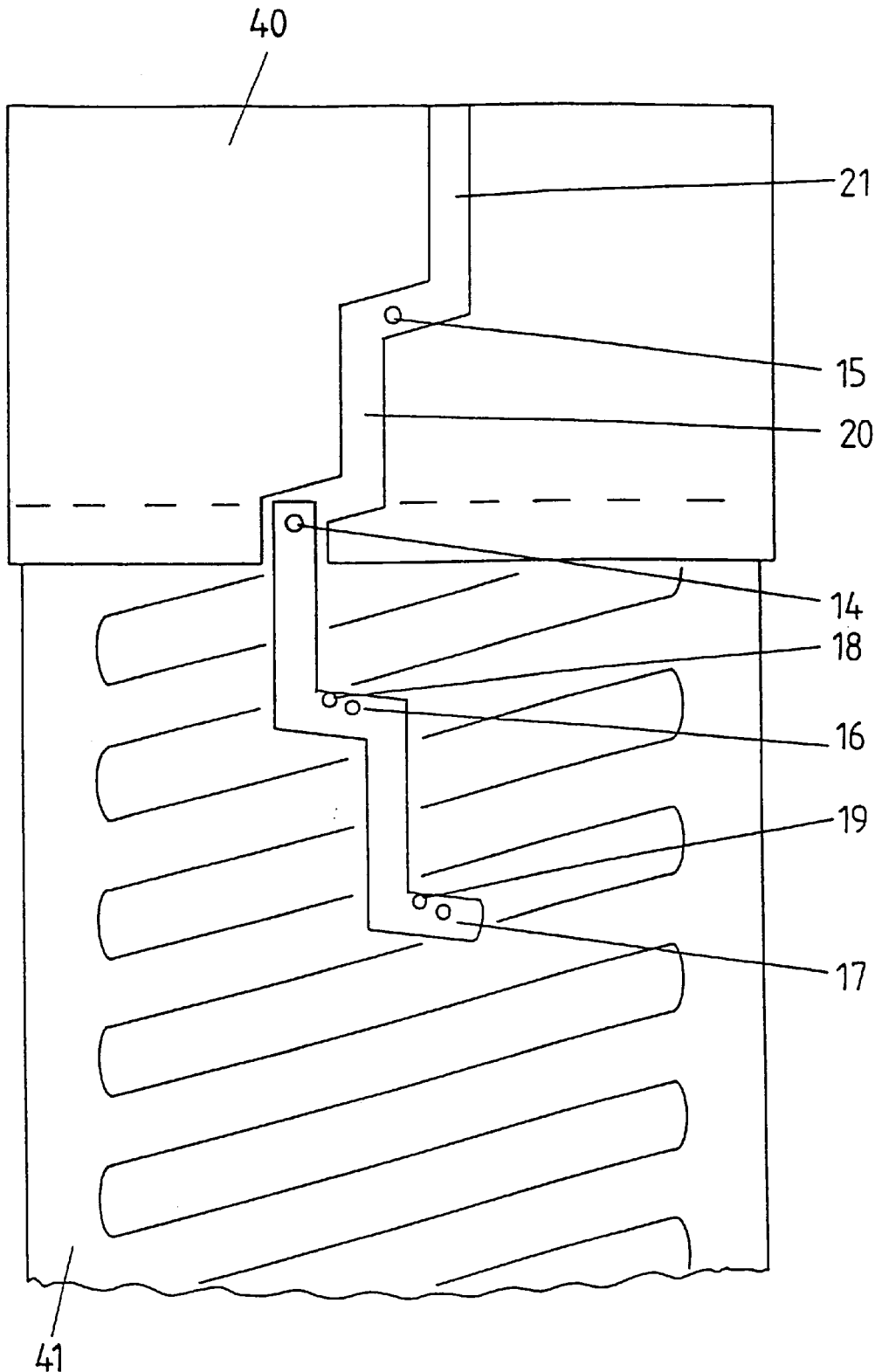
FIG. 9 is an enlarged representation of another programming path.

FIG. 9 is an enlarged representation once again showing the essential function elements according to FIG. 5. In particular it can clearly be seen that the guide slots are arranged in the area of tube-shaped members. In the drawing a runner tube 40 and a program tube 41 are differentiated. By predetermining the switching path 37 in the range of the program tube 41 it is possible to individually specify any type of work paths, and adapt them to a respective necessity. The runner tube 40 may be programmed correspondingly as an energy-receiving sleeve. For example it is possible to program the included spring 34 such that a first displacement path extends as far as a first stage. Subsequently to the first stage the first open path 20 takes effect. Subsequently the second drive member 15 takes effect and draws the coupled parts into the range of the second stage 17. Subsequently the second open path 21 takes effect.

It is e.g. possible to design the programmed path for a rotation angle of 180 degrees. If the respective connected wheel is rotated through 180 degrees, then a sequence completing 360 degrees is performed and the spring 34 e.g. having the form of a pressure spring retracts the previously positioned components in accordance with the program.

In particular it is possible to provide intermediate storages over a total provided tensioning path. The desired programming is carried out in the range of the runner tube 40. Any desired number of intermediate storages may be carried out along a possible tensioning path. Programming may be performed in the range of the runner tube 40 as well as in the range of the programming tube 41.

Figure 10:
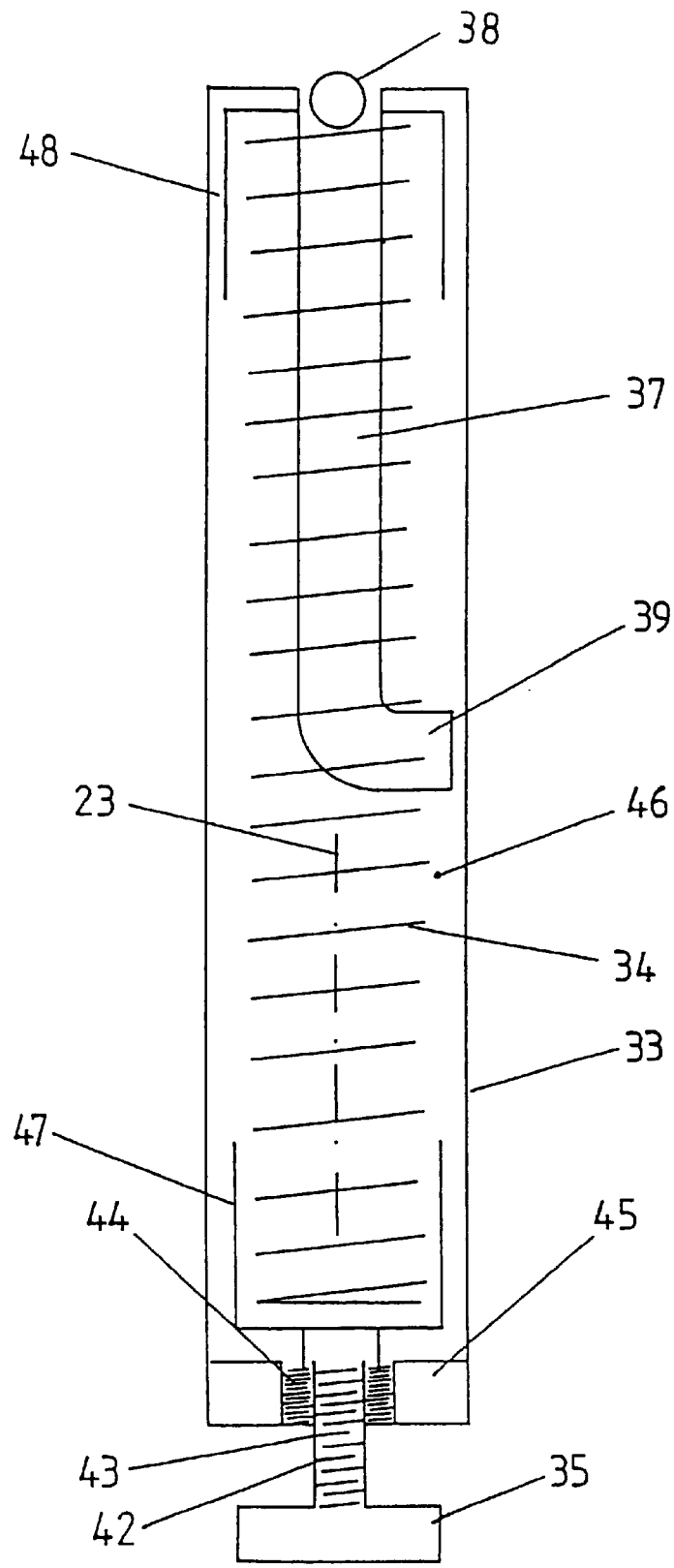
FIG. 10 shows another variation implementing the invention.

Another variation of the invention is represented in FIG. 10. The structure basically resembles the representation according to FIG. 8. Analogously, a spring 34 which may be biased by an adjustment member 35 is arranged in the range of a standing body 33. The adjustment member 35 employs a stem 42 having an external thread 43 for engagement with an internal thread 44 of a bottom part 45 of the standing body 33. Inside a cavity 46 of the standing body 33 accommodating the spring 34, a mounting cup 47 having an end of the spring 34 inserted into it is provided. The mounting cup 47 is connected to the stem 42.

Upon displacement of the adjustment member 35, the mounting cup 47 is displaced in the direction of the longitudinal axis 23 while transferring the bias to be adjusted to the spring 34. It can also be seen that the drive member 38 is coupled to a working cup 48 accommodating that end of the spring 34 which faces away from the mounting cup 47. When the drive member 38 is displaced, the working cup 48 connected thereto is displaced and applies corresponding tensioning forces to the spring 34.

Figure 11:
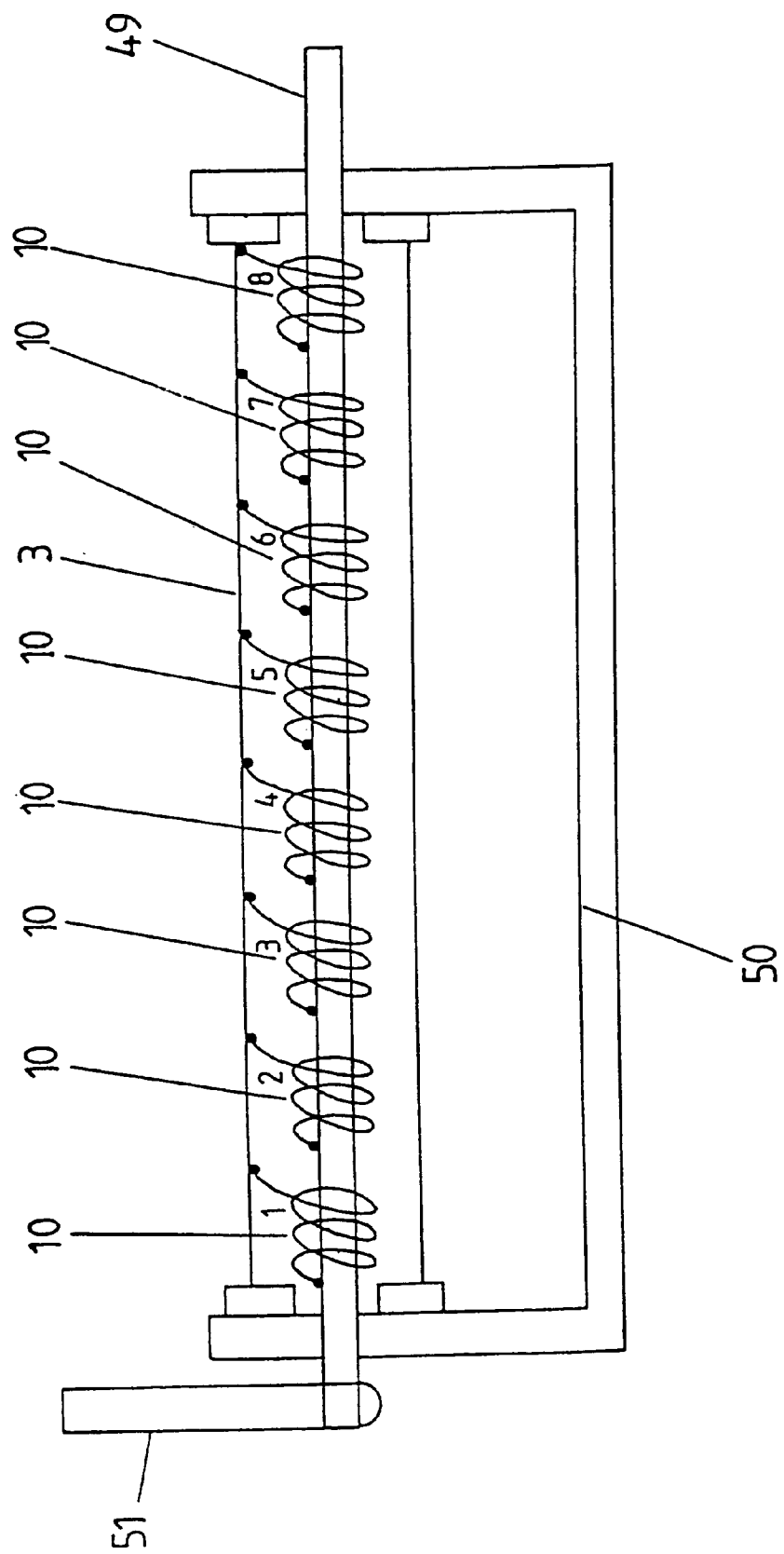
FIG. 11 shows a device wherein a torsion spring is subdivided into a plurality of single springs.

FIG. 11 shows a variation of the invention wherein a plurality of springs 10 having the form of torsion springs are arranged inside a spring receiving sleeve 3. In the specific embodiment, eight springs 10 are arranged inside the spring receiving sleeve 3. The springs 10 are each secured to the spring receiving sleeve 3 in the range of one end thereof. Another end of the springs 10 is coupled to a shaft 49. The shaft 49 is guided rotatably inside a support member 50, and the spring receiving sleeve 3 is secured such as to be immobile relative to the support member 50. To the shaft 49 there is secured a weight body 51 which generates a counter force counteracting the forces of the springs 10 at the shaft 49.

If e.g. each one of these springs 10 is dimensioned so as to generate a maximum spring force of 20 kp, this results in a total force of 160 kp when the effects of the eight springs are added up. Compared with a basically possible use of one single spring having a maximum spring force of 160 kp, use of eight separate springs 10 advantageously provides the possibility of reducing the total structural weight inasmuch as only relatively low forces must be generated in the range of each one of the springs 10. This allows for a reduction of the material for the springs 10.

It is basically possible to arrange any number of springs 10 inside the spring receiving sleeve 3. Distribution of the required spring force to single springs 10 may thus be carried out in accordance with the respective marginal conditions of use. In the case of this device, too, it is possible to realize biasing properties of the springs 10. The spring bias may be adjusted by suitable arrangement of the spring receiving sleeve 3 in the range of the support members 5. In particular it is conceivable to design the support member 50 as a support frame.

Figure 12:
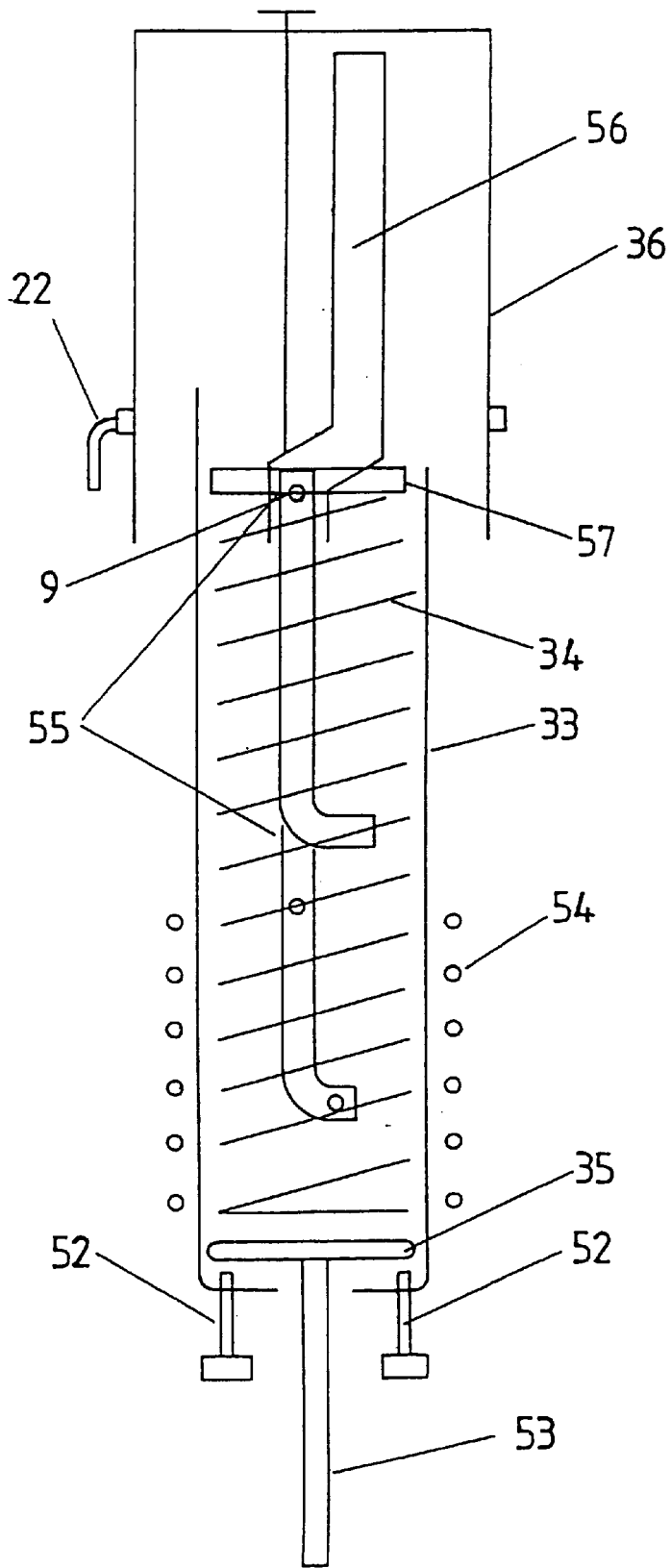
FIG. 12 shows another variation implementing a programming path including an open path.

FIG. 12 represents a further variation of a linear arrangement of the device. A spring 34 which can be biased by an adjustment member 35 is again arranged in the range of a standing body 33. Screws 52 are provided for positioning the adjustment member 35. Pulling means 53 are coupled to the standing body 33. The pulling means 53 may e.g. have the form of a chain. Externally surrounding the standing body 33 an attenuation spring 54 is arranged which serves as a shock absorber. The attenuation spring 54 pushes back the force receiving sleeve 36 if the latter enters into the range of the attenuation spring 54.

Force output means e.g. having the form of an energy transmission rod 22 are coupled to the force receiving sleeve 36. An available tensioning path 55 is represented in FIG. 12. In the event of a displacement of the energy-receiving sleeve 36 relative to the standing body 33, an open path 56 is initially available during which no pressure is applied to the spring 34. After the tensioning path 55 is reached, a tension of the spring 34 is transmitted via the drive pin 9 and a pressure plate 57 coupled thereto. In the range of the latch 39 the drive pin 9 is immobilized following tensioning, resulting in a relaxation of force.

Figure 13:
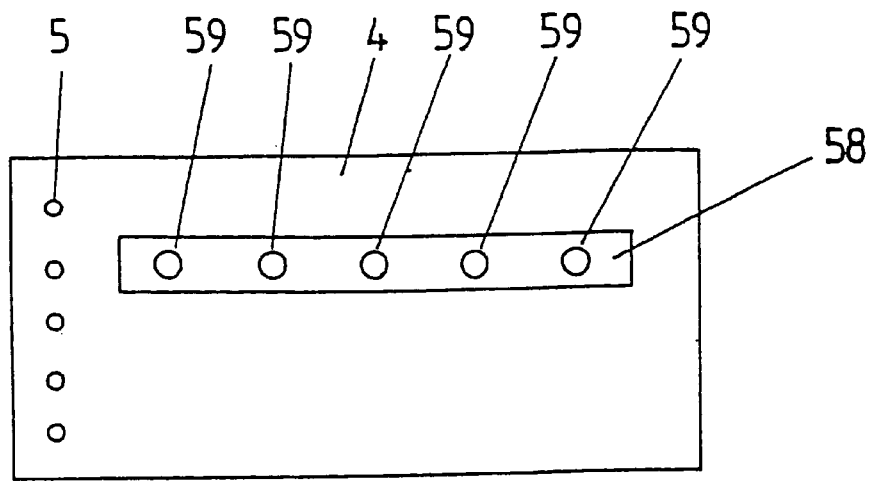
FIG. 13 shows a guide sleeve including biasing latches and a guide slot for spring ends.

FIG. 13 shows a lateral view of the biasing sleeve 4 provided with the latch recesses 5. The biasing sleeve 4 includes a longitudinal slot 58 engaged by spring ends 59 of a plurality of springs 10. Rotation of the biasing sleeve 4 results in all of the springs 10 being biased simultaneously. Instead of a linear longitudinal slot 58, it is basically also conceivable to use a contoured slot 58 which biases the various springs 10 in various degrees upon a rotation of the biasing sleeve 4.

Figure 14:
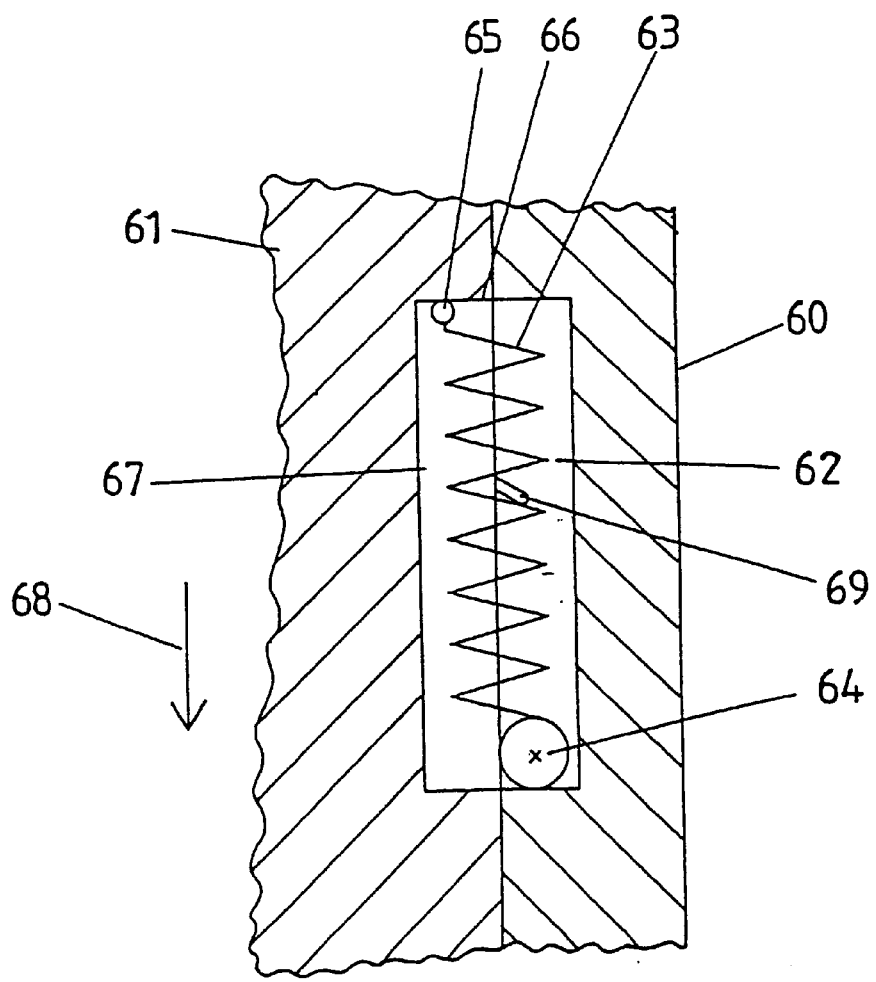
FIG. 14 is a schematic representation illustrating springs which may be immobilized along a displacement path and which are pivotable in the range of a terminal point.

FIG. 14 is a cross-sectional representation of the arrangement of a runner 61 which is movable relative to a stationary retaining element 60. The retaining element 60 includes a recess 62 wherein a spring 63 is mounted pivotally by means of a joint 64. In a pivoted condition, a pressure member 65 of the spring 63 is guided into contact with a pressure surface 66 which may have the form of a border of a recess 67 in the runner. Upon displacement of the runner 61 in a tensioning direction 68, the spring 63 is compressed and in a loaded condition immobilized with the pressure member 65 in the range of a reception 69 provided in the area of the stationary retaining element 60. In this condition, energy is stored by the spring 63 and no further force is applied to the runner 61. The runner 61 may thus, in the absence of load from the spring 63, be moved further in the tensioning direction 68 to tension further springs 63.

Upon release of the springs 63, the runner 61 is moved opposite to the tensioning direction 68. The provided springs 63 thus act on the runner 61 sequentially or in temporally overlapping relation and are thus capable of conveying it along a long path opposite to the tensioning direction 68. Even where such a stroke is large, the required springs 63 only need to have comparatively small dimensions and may thus be accommodated in a small construction space.

Figure 15:
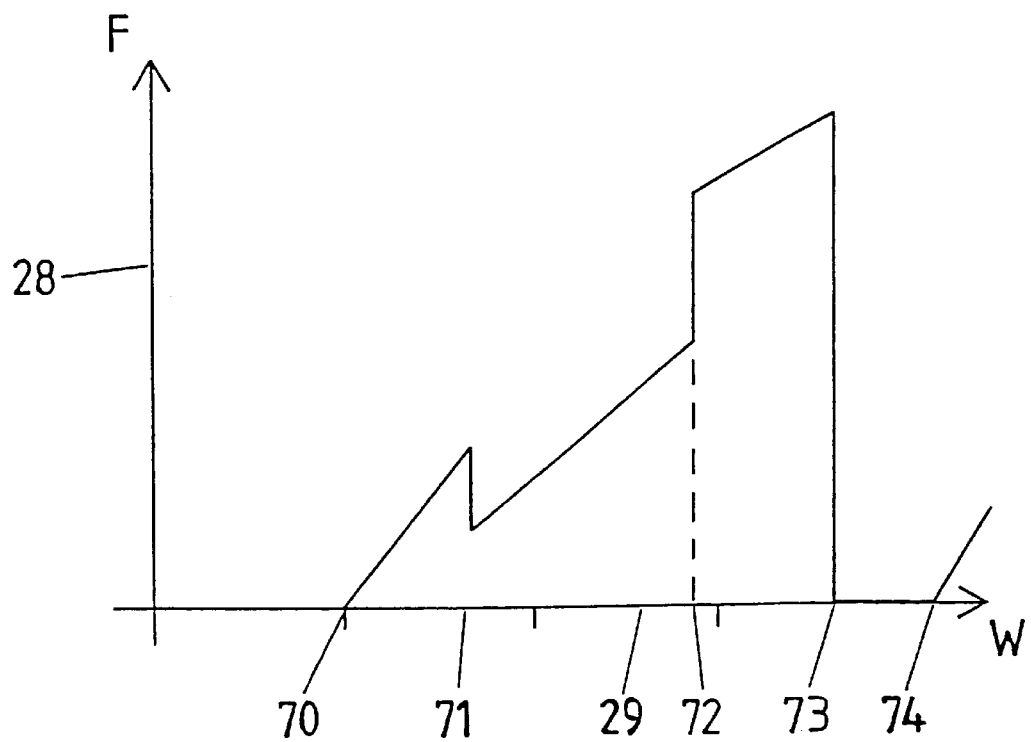
FIG. 15 shows a force/path-diagram illustrating another programmable energy release pattern along a displacement path.

Analogous with FIG. 7, FIG. 15 shows another force/path-diagram plotted in accordance with a force axis 28 and a path axis 29. As far as a changeover point 70, application of force by a corresponding open path does not occur here. Starting from the changeover point 70 a spring takes effect to build up a linear force. Starting from a changeover point 71 the first spring is immobilized and a second spring provided with a bias takes effect. Starting from the changeover point 72 another spring provided with a bias takes effect in addition to the previously activated spring. Starting from the changeover point 73, in turn, an open path associated with all of the springs takes effect. Starting from the changeover point 74, a further linear increase in force takes place due to activation of another spring. By correspondingly combining a plurality of springs, it is thus possible to realize virtually any type of force/path-diagrams. If tension springs and pressure springs are combined, even opposed forces may be stored.

Notwithstanding the type of used springs, namely torsion springs and linear springs, it is possible to provide predetermined latch mechanisms. It is possible to use e.g. spring rings including locking elements, transverse pins or the like components. As an alternative for the use of L-shaped slots for immobilizing loaded springs it is also possible to use other types of latch elements. It is possible e.g. to use stationary latching members or energy-receiving latching disks.

In addition to using springs it is possible to provide mechanical immobilization elements. It is possible for example to provide immobilization by means of pegs which engage U-shaped grooves. Immobilization may e.g. be effected automatically after guiding the peg into the range of the groove. For the purpose of release, button actuation may be provided which is performed by a user to push the peg back out of the groove. A plurality of other approaches are, however, also conceivable for realizing the immobilization means, e.g. ratchet wheels or other profiles.

Figure 16:
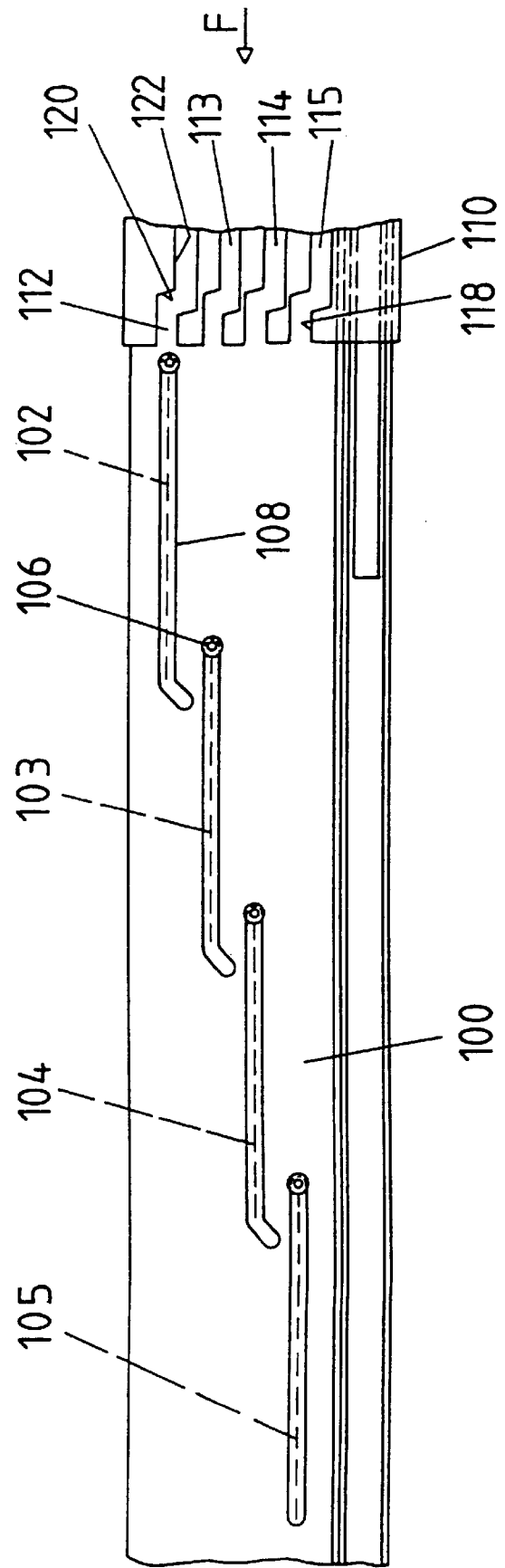
FIG. 16 is a schematic representation of another embodiment of a spring storage.

FIG. 16 shows another embodiment of the spring storage in accordance with the invention, which again preferably employs axial actuation of the pressure springs/tension springs in analogy with the embodiments described in connection with FIGS. 4 to 15.

In the embodiment shown in FIG. 16, a plurality of spring members 102 to 105 are mounted in a spring receiving sleeve 100. These spring members have a staggered arrangement relative to each other in the axial direction and transversally with respect to the axial direction. Each drive member 106 of a spring member 102 to 105 extends through a slot-shaped guide path 108 which includes a linear portion and portion extending at an angle thereto.

In the shown embodiment the spring receiving sleeve 100 has the form not of a tube but rather of a box-type casing. The geometry of the spring receiving sleeve 100 may, of course, be varied at will. It should merely be ensured that a plurality of spring members can be accommodated in staggered configuration in the axial direction. In the shown embodiment the angled end portion of each guide path 108 overlaps with the linear portion of the neighboring guide path 108; thus when the spring storage is impinged, the one spring member 102 is biased in its end portion while the neighboring spring member 103 already receives an applied load in the starting portion.

On the spring receiving sleeve 100, a drive member sleeve 110 is slidingly guided. The drive member sleeve 110 includes a plurality of juxtaposed (view of FIG. 16) slots 112 to 115 which open into the rim facing the guide paths 108 of the spring receiving sleeve 100. In accordance with the representation of FIG. 16, each slot 112 to 115 comprises a first linear portion 118 which is parallel with the axis and formed to be coaxial with a respective one of guide paths 108 (linear portion). The first linear portion 118 is followed by an angled contact portion 120 providing a contact surface for the drive member 106. The contact portion 120 continues into another linear portion 122 of the respective slots 112 to 115 generally having a greater length than the first linear portion 118. For the sake of simplicity, merely the important starting portions of slots 112 to 115 are shown in the representation of FIG. 16.

When the spring member is impinged in the direction F (FIG. 16), the drive member sleeve 110 is displaced relative to the stationary spring receiving sleeve 100, whereby initially the drive member 106 of the spring member 102 is introduced into the first linear portion 118 of slot 112. As the first linear portion 118 is formed coaxially, the drive member is not displaced in this relative position of the drive member sleeve 110. I.e., the first linear portion 118 serves as an open path portion. Upon another relative displacement of the drive member sleeve 110, the drive member 106 contacts the stop surface of the contact portion 120, whereby the drive member 106 is drivingly engaged by the drive member sleeve 110 such that the spring member 102 is biased.

Following another relative displacement of the drive member sleeve 110, the drive member 106 of the spring member 103 is then introduced into the associated slot 113, resulting in the same loading process as described above. Subsequently the drive member 106 of the spring member 102 enters the angled end portion of the guide path 108, whereby the drive member is displaced transversally with respect to the axial direction of the spring receiving sleeve 100 and is thus displaced away from the contact portion 120 into the further linear portion 122 of the drive member sleeve 110. Due to positive reception of the drive member 106 between the contact portion 120 and the angled end portion, the drive member 106 is prevented from returning into the linear portion of the guide path 108, whereby the drive member 106 is retained in its stop position at the angled end portion of the guide path 108 during further axial displacement of the drive member sleeve 110.

Tensioning of the remaining spring members 103 to 106 is achieved in the same manner and need not be described in detail.

Upon release of the drive member sleeve 110, the spring members 102 and 105 are relaxed in the reverse order, with the individual spring members releasing the spring energy stored by them during the reverse movement in the drive member sleeve 110 only if the drive member 106 contacts the contact portion 120. While the drive member is present in the linear portions 118, 122, energy stored in the springs is not released.

Figure 17:
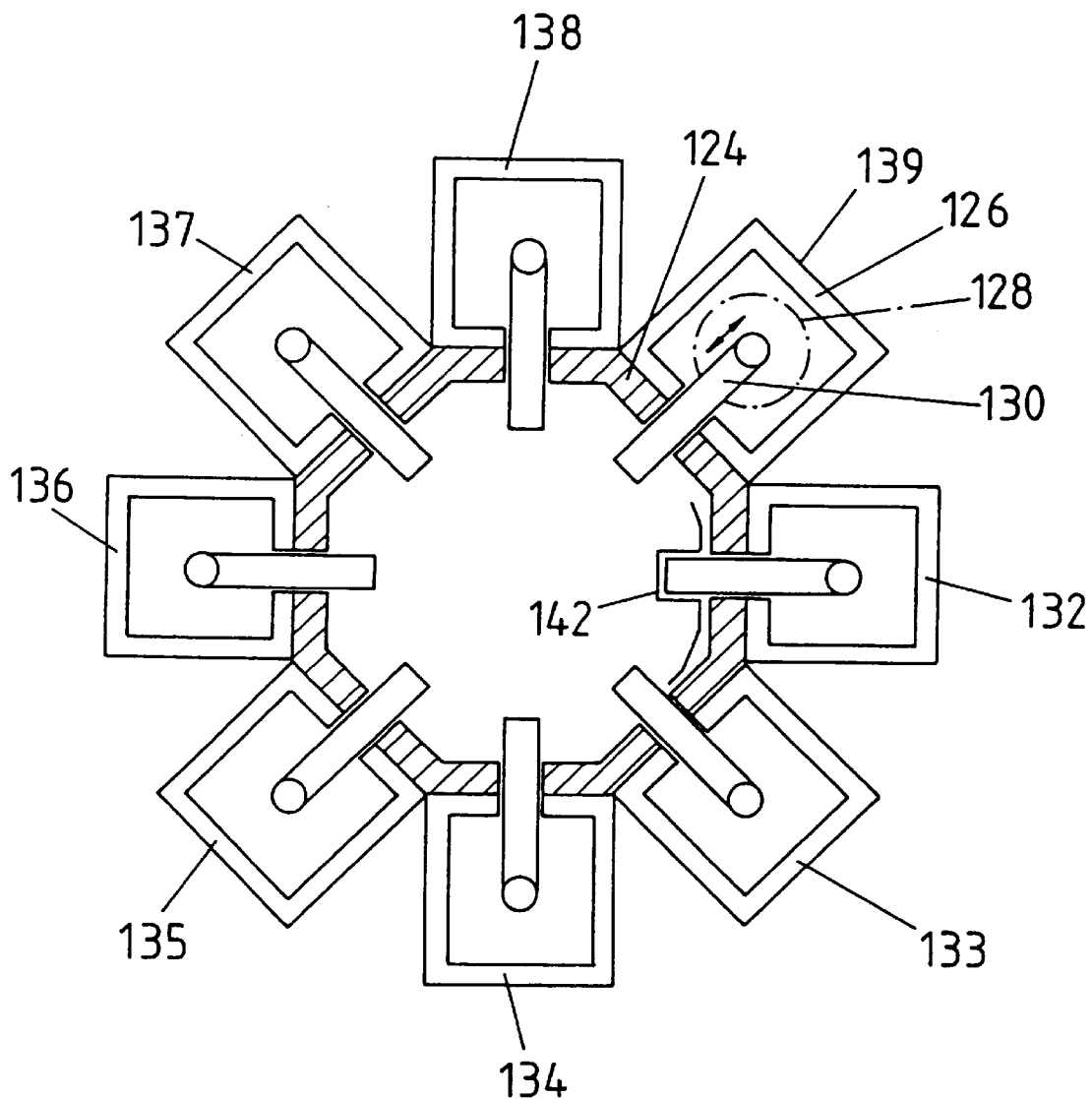
FIG. 17 is a sectional view of a spring storage having a central main pressure tube and a multiplicity of externally arranged spring storage elements.

FIGS. 17 and 18 show another embodiment of the spring storage in accordance with the invention.

FIG. 17 shows a cross-section of this embodiment. Accordingly, the spring storage comprises an octagonal main pressure tube 124, the cross-section of which is represented in FIG. 17. To each side face (in a direction perpendicular to the plane of the drawing in FIG. 17) of the main pressure tube 124 a spring receiving sleeve 126 is secured wherein one or several spring members 128 (possibly in axial succession) are arranged. The design of the spring receiving sleeve 126 and of the spring member(s) 128 may in principle resemble the design described in connection with the previous embodiments. Accordingly an end portion of the spring members 128 is supported in the spring receiving sleeve 126 whereas the other end portion is e.g. provided with a drive member 130 penetrating through the neighboring side wall of main pressure tube 124 and the associated wall surface of the spring receiving sleeve 126, such that an end portion of the drive member 130 projects into the cavity defined by the main pressure tube 124. In the side wall of the main pressure tube 124 and in the associated wall surface of the spring receiving sleeve 126, slots are formed which permit an axial displacement (in a direction perpendicular to the plane of the drawing in FIG. 17) of the drive member 130.

In the shown embodiment the main pressure tube 124 carries eight spring storage elements 132 to 138 which are arranged in parallel with the axis 124 of the main pressure tube.

Inside the main pressure tube 124, a pressure piston (not represented) acting as an energy-receiving or force-transmitting member is guided slidingly. When a force is applied to the pressure piston, it is displaced downwardly in the view of FIG. 17 such that the drive members 130 are drivingly engaged by contact with the pressure piston. As a result, the spring members 128 are biased.

FIG. 18 shows the developed surface of the main pressure tube, indicating the arrangement of the slots 140 which serve to guide the drive member 130.

The geometry of each slot 140 in a partial surface of the main pressure tube 124 corresponds essentially to the one described in connection with the embodiment of FIG. 16. For example, each slot 140 includes a linear portion which continues into an angled end portion.

As can be taken from the representation according to FIG. 18, the eight slots 140 of the main pressure tube 124 are arranged in two groups. Four slots 140 open into the upper rim of the main pressure tube 124 in the representation of FIG. 18, whereas the other four slots 140 are staggered in the axial direction. As a result of this arrangement, initially only the drive members 130 guided in the former slots are drivingly engaged upon a downward movement of the pressure piston in the direction of the arrow (FIG. 18), whereby the spring members 118 of the associated spring storage element are loaded. The bias of the other four spring storage elements occurs only following a predetermined axial displacement of the pressure piston. Of course, the geometry of slots 140 and the axial position of drive members 130 might also be designed in another manner, with e.g. all of the drive members 130 being staggered axially, such that the spring storage elements 132 to 138 are loaded successively.

In the above described embodiment, the slots 140 are formed in the side walls of the main pressure tube 124. The corresponding slots in the wall surface of the spring receiving sleeve 126 would then have to be designed to have a corresponding width or at least a sufficient width for the respective drive member 130 to be freely slideable in the slots 140 (in an axial direction or transversally thereto).

As an alternative embodiment, the angled slots 140 represented in FIG. 18 might also be formed in the wall surface 126 of the spring receiving sleeve and form slots in the main pressure tube 124 which admit the entire axial and transversal displacement of the drive member pin 130. I.e., in the former case the guide paths are formed in the main pressure tube 124, whereas in the latter case the guide paths are provided in the spring receiving sleeve 126.

In the case of the geometry represented in FIG. 18, the neighboring slots are in turn arranged such as to overlap, whereby during a predetermined stroke portion of the pressure piston the spring storage elements of both groups are loaded and release energy during the return movement of the main piston.

In order to permit displacement of the main piston downwardly beyond the angled end portion of the group of upper slots (FIG. 18), care must be taken that at least the drive members arranged at the top in FIG. 18 can be moved out of the range of collision with the main piston. For this purpose, corresponding guide inclines can be formed, e.g. at the pressure piston, which move the drive member outwardly when it arrives at its final position in the angled portion of the slot 140, with the result that its end portion ceases to project into the cavity of the main pressure tube 124 and the pressure piston can be moved further downward, i.e. the drive members 130 are removed.

As an alternative, the main pressure piston may be provided with guide recesses 142 (indicated in FIG. 17) into which the drive member 130 enters in its terminal position, such that the main piston can be moved further downward. In this case, too, the return movement of the drive member 130 away from its terminal position is prevented as the drive member 130 cannot evade in a lateral direction to thereby enter into the linear portion of slot 140.

Upon the return movement of the pressure piston, the drive member 130 is then either returned from its retracted position into its starting position represented in FIG. 17, or else it is—in the latter embodiment—moved out of the associated guide recess 142 such as to return into its contacting position with the piston end face.

Just like in the previously described embodiments, each spring storage element 132 to 139 may again be provided with a biasing means 144 which makes it possible to bias the spring members 128 independently of the pressure piston movement.

In the two embodiments named last, a multiplicity of spring members are biased simultaneously and/or successively. In modification of this embodiment, the construction principles of the invention—e.g. formation of guide paths in the spring receiving sleeve and of slots including open path portions, stop portions and linear portions in the drive member sleeve 110—may also be applied to spring storages wherein only one spring member or more than the shown spring members are used. The geometries of slots/guide paths as shown in the individual embodiments are, of course, suited for all embodiments. Namely, all of the structural components of the individual embodiments are freely combinable with each other in order to arrive at the solution according to the invention.

What is claimed is:

1. Device for storing spring energy generated by relative displacement of a stationary retaining element and a mobile runner, which comprises:

at least two springs arranged between the retaining element and the runner, wherein a first end portion of each spring is attached to the retaining element, the two springs being biasable in temporal succession, upon relative displacement into a first direction, and being able to release spring energy in temporal succession, upon relative displacement into a second direction opposite to said first direction, a second end portion which is opposite to the first end portion of the spring loaded at a first point in time is immobilized in relation to the retaining element by a first displacement transversal to the direction of the relative displacement in such a way that, during a further relative displacement of said runner in the first direction, no further force is exerted between said runner and said retaining element by said spring loaded at said first point in time, and wherein the immobilized second end portion of the spring loaded at said first point in time, upon relative displacement into the second direction, is connectable to the runner and said spring is enabled to output spring energy during a further relative displacement into said second direction.

2. The device according to claim 1, wherein said second portion of the spring comprises a pressure member and the spring is able to be immobilized in a loaded condition in a reception portion of said retaining element through said pressure member.

3. The device according to claim 1, wherein said at least two springs having working ranges overlapping in a direction of displacement.

4. The device according to claim 1, wherein said at least two springs are arranged in parallel in a direction of displacement.

5. Device for storing spring energy generated by relative displacement of a stationary retaining element and a mobile runner, which comprises:

at least two springs arranged between the retaining element and the runner, wherein a first end portion of each spring is attached to the retaining element, the two springs being biasable in temporal succession, upon relative displacement into a first direction, and being able to release spring energy in temporal succession, upon relative displacement into a second direction opposite to said first direction, a second end portion which is opposite to the first end portion of the spring loaded at a first point in time is immobilized in relation to the retaining element by a first displacement transversal to the direction of the relative displacement in such a way that, during a further relative displacement of said runner in the first direction, no further force is exerted between said runner and said retaining element by said spring loaded at said first point in time, wherein the immobilized second end portion of the spring loaded at said first point in time, upon relative displacement into the second direction, is connectable to the runner and said spring is enabled to output spring energy during a further relative displacement into said second direction and wherein said retaining element comprises a sleeve and said runner is guided inside said retaining element.

6. Device for storing spring energy generated by relative displacement of a stationary retaining element and a mobile runner, which comprises:

at least two springs arranged between the retaining element and the runner, wherein a first end portion of each spring is attached to the retaining element, the two springs being biasable in temporal succession, upon relative displacement into a first direction, and being able to release spring energy in temporal succession, upon relative displacement into a second direction opposite to said first direction, a second end portion which is opposite to the first end portion of the spring loaded at a first point in time is immobilized in relation to the retaining element by a first displacement transversal to the direction of the relative displacement in such a way that, during a further relative displacement of said runner in the first direction, no further force is exerted between said runner and said retaining element by said spring loaded at said first point in time, wherein the immobilized second end portion of the spring loaded at said first point in time, upon relative displacement into the second direction, is connectable to the runner and said spring is enabled to output spring energy during a further relative displacement into said second direction and wherein a drive member is provided at the second end portion of the spring and is positionable in at least one slit of the runner, said slit having two linear portions extending in a direction of the relative displacement and an angled contact portion.

7. Device for storing spring energy generated by relative displacement of a stationary retaining element and a mobile runner, which comprises:

at least two springs arranged between the retaining element and the runner, wherein a first end portion of each spring is attached to the retaining element, the two springs being biasable in temporal succession, upon relative displacement into a first direction, and being able to release spring energy in temporal succession, upon relative displacement into a second direction opposite to said first direction, a second end portion which is opposite to the first end portion of the spring loaded at a first point in time is immobilized in relation to the retaining element by a first displacement transversal to the direction of the relative displacement in such a way that, during a further relative displacement of said runner in the first direction, no further force is exerted between said runner and said retaining element by said spring loaded at said first point in time, wherein the immobilized second end portion of the spring loaded at said first point in time, upon relative displacement into the second direction, is connectable to the runner and said spring is enabled to output spring energy during a further relative displacement into said second direction and wherein a drive member is provided at the second end portion of the spring and is positionable in at least one slit of the runner, said slit having two linear portions arranged in a direction of the relative displacement and an angled contact portion and wherein said drive member extends through a slot-shaped guide path of the retaining element which includes a linear portion extending in the direction of the relative displacement and an end portion extending at an angle thereto.

8. Device for storing spring energy generated by relative displacement of a stationary retaining element and a mobile runner, which comprises:

at least two springs arranged between the retaining element and the runner, wherein a first end portion of each spring is attached to the retaining element, the two springs being biasable in temporal succession, upon relative displacement into a first direction, and being able to release spring energy in temporal succession, upon relative displacement into a second direction opposite to said first direction, a second end portion which is opposite to the first end portion of the spring loaded at a first point in time is immobilized in relation to the retaining element by a first displacement transversal to the direction of the relative displacement in such a way that, during a further relative displacement of said runner in the first direction, no further force is exerted between said runner and said retaining element by said spring loaded at said first point in time, wherein the immobilized second end portion of the spring loaded at said first point in time, upon relative displacement into the second direction, is connectable to the runner and said spring is enabled to output spring energy during a further relative displacement into said second direction and which comprises a drive member provided at the second end portion of the spring and is positionable in at least one slit of the runner, said slit having two linear portions arranged in a direction of the relative displacement and an angled contact portion, wherein said drive member extends through a slot-shaped guide path of the retaining element which includes a linear portion extending in the direction of the relative displacement and an end portion extending at an angle thereto and wherein at least two drive members are provided and both two guide paths and two slits are provided in said at least two drive members.

9. Device for storing spring energy generated by relative displacement of a stationary retaining element and a mobile runner, which comprises:

at least two springs arranged between the retaining element and the runner, wherein a first end portion of each spring is attached to the retaining element, the two springs being biasable in temporal succession, upon relative displacement into a first direction, and being able to release spring energy in temporal succession, upon relative displacement into a second direction opposite to said first direction, a second end portion which is opposite to the first end portion of the spring loaded at a first point in time is immobilized in relation to the retaining element by a first displacement transversal to the direction of the relative displacement in such a way that, during a further relative displacement of said runner in the first direction, no further force is exerted between said runner and said retaining element by said spring loaded at said first point in time, wherein the immobilized second end portion of the spring loaded at said first point in time, upon relative displacement into the second direction, is connectable to the runner and said spring is enabled to output spring energy during a further relative displacement into said second direction and wherein the retaining element comprises a pressure tube, a drive member is arranged at the second end portion of each spring, the free end portion of each drive member projects into the cavity of said pressure tube, and the runner comprises a pressure piston.

10. Device for storing spring energy generated by relative displacement of a stationary retaining element and a mobile runner, which comprises:

at least two springs arranged between the retaining element and the runner, wherein a first end portion of each spring is attached to the retaining element, the two springs being biasable in temporal succession, upon relative displacement into a first direction, and being able to release spring energy in temporal succession, upon relative displacement into a second direction opposite to said first direction, a second end portion which is opposite to the first end portion of the spring loaded at a first point in time is immobilized in relation to the retaining element by a first displacement transversal to the direction of the relative displacement in such a way that, during a further relative displacement of said runner in the first direction, no further force is exerted between said runner and said retaining element by said spring loaded at said first point in time, wherein the immobilized second end portion of the spring loaded at said first point in time, upon relative displacement into the second direction, is connectable to the runner and said spring is enabled to output spring energy during a further relative displacement into said second direction and wherein one spring of said at least two springs is arranged inside of the stationary retaining element and another spring of said at least two springs is arranged outside the stationary retaining element.

* * * * *